(12) United States Patent
Thurner et al.

(10) Patent No.: US 9,829,306 B2
(45) Date of Patent: Nov. 28, 2017

(54) ABSOLUTE DISTANCE LASER INTERFEROMETER

(71) Applicant: attocube Systems AG, Munich (DE)

(72) Inventors: Klaus Thurner, Munich (DE); Khaled Karrai, Munich (DE); Pierre-Francois Braun, Munich (DE)

(73) Assignee: attocube Systems AG, Munich (DE)

( * ) Notice: Subject to any disclaimer, the term of this patent is extended or adjusted under 35 U.S.C. 154(b) by 618 days.

(21) Appl. No.: 14/284,756

(22) Filed: May 22, 2014

(65) Prior Publication Data

US 2015/0019160 A1 Jan. 15, 2015

(30) Foreign Application Priority Data

May 24, 2013 (EP) ..................................... 13169159

(51) Int. Cl.
*G01B 9/02* (2006.01)
*G01B 11/00* (2006.01)

(52) U.S. Cl.
CPC ........... *G01B 9/02* (2013.01); *G01B 9/02002* (2013.01); *G01B 9/02003* (2013.01);
(Continued)

(58) Field of Classification Search
CPC ...... G01B 11/00; G01B 2290/25; G01B 9/02; G01B 9/02002; G01B 9/02003; G01B 9/02004; G01B 9/02007
(Continued)

(56) References Cited

U.S. PATENT DOCUMENTS

| 4,355,899 A | 10/1982 | Nussmeier |
| 4,830,486 A * | 5/1989 | Goodwin ........... G01B 11/2441 250/559.38 |

(Continued)

FOREIGN PATENT DOCUMENTS

| EP | 0260894 A1 | 3/1988 |
| EP | 2589923 A1 | 5/2013 |

(Continued)

OTHER PUBLICATIONS

A. Dandridge et al. "Homodyne Demodulation Scheme for Fiber Optic Sensors Using Phase Generated Carrier", IEEE Journal of Quantum Electronics, vol. QE-18, No. 10, Oct. 1982, p. 1647-1653.

(Continued)

*Primary Examiner* — John H Le
(74) *Attorney, Agent, or Firm* — Cooper Legal Group, LLC

(57) ABSTRACT

A device for absolute distance measurement includes a first tunable light source for emitting a first wavelength light of a first tunable frequency modulated by a first modulating frequency and a second light source for emitting a second wavelength light of a second frequency modulated by a second modulating frequency. An optical coupler couples the first wavelength light and the second wavelength light into an interferometer cavity. An interferometer detector provides an interference measurement signal based on a detected interference pattern. A demodulator unit generates a first demodulation signal based on the interference measurement signal by demodulation with the first modulating frequency and a second demodulation signal based on the interference measurement signal by demodulation with the second modulating frequency. A computation unit computes an absolute distance by evaluating the first demodulation (Continued)

signal acquired during a sweep of the first tunable frequency and the second demodulation signal.

14 Claims, 6 Drawing Sheets

(52) U.S. Cl.
CPC ..... *G01B 9/02004* (2013.01); *G01B 9/02007* (2013.01); *G01B 11/00* (2013.01); *G01B 2290/25* (2013.01)

(58) Field of Classification Search
USPC .......... 702/70, 71, 72, 75, 97, 150; 250/343, 250/559.38; 356/4.09, 450, 498, 499; 375/141
See application file for complete search history.

(56) References Cited

U.S. PATENT DOCUMENTS

| 7,292,347 | B2* | 11/2007 | Tobiason | G01B 9/02004 356/498 |
|---|---|---|---|---|
| 2007/0002932 | A1* | 1/2007 | Shirai | G01S 7/292 375/141 |
| 2008/0117424 | A1* | 5/2008 | Teramura | G01B 9/02004 356/450 |
| 2010/0259760 | A1 | 10/2010 | Karrai | |
| 2011/0205523 | A1 | 8/2011 | Rezk et al. | |
| 2011/0211198 | A1* | 9/2011 | Koda | G01B 9/02004 356/499 |
| 2011/0211199 | A1 | 9/2011 | Karrai et al. | |

FOREIGN PATENT DOCUMENTS

| JP | 6439505 | A | 2/1989 |
|---|---|---|---|
| JP | 039202 | A1 | 1/1991 |
| JP | 201510943 | A | 12/2012 |
| WO | 2010006764 | A2 | 1/2010 |

OTHER PUBLICATIONS

C. K. Kirkendall et al., "Overview of high performance fibre-optic sensing", J. Phys. D: Appl. Phys. 37, Sep. 1, 2004, R197-R216.
H. Kikuta et al., "Distance measurement by the wavelength shift of laser diode light", Applied Optics, vol. 25, No. 17, Sep. 1, 1986, p. 2976-2980.
C. C. Williams et al. "Absolute optical ranging with 200-nm resolution", Optics Letters, vol. 14, No. 11, Jun. 1, 1989, p. 542-544.
K. Meiners-Hagen et al., "Multi-Wavelength Interferometry for Length Measurements Using Diode Lasers", Measurement Science Review, vol. 9, Section 3, No. 1 /2009, p. 16-26.
Y. Cheng et al., "Two-wavelength phase shifting interferometry", Applied Optics, vol. 23, No. 24, p. 4539-4543, Dec. 15, 1984.

\* cited by examiner

ABSOLUTE DISTANCE LASER INTERFEROMETER

RELATED APPLICATION

This application claims the benefit of European Patent Application 13 169 159.4, filed on May 24, 2013, which is incorporated herein by reference.

FIELD

The disclosure relates to a device and method for absolute distance measurement, and, in particular, to the technology of absolute distance measurement by interferometry.

BACKGROUND

In many fields of application, it is required to determine the absolute distance of an object with a high degree of accuracy. Interferometric measurement devices typically use incremental methods for determining the displacement of an object with high positional resolution. However, incremental methods for tracking a position of an object often do not allow to determine the absolute distance of an object in repeatable measurements. It is desired to provide for a simple, robust and accurate device for absolute distance measurement.

SUMMARY

According to one aspect, the device for position or absolute distance measurement may comprise a first tunable light source and a second light source. A first wavelength light emitted from the first tunable light source is modulated by a first modulating frequency, and a second wavelength light emitted from the second light source is modulated by a second modulating frequency. The first light source and the second light source may, e.g., be implemented by one common laser emitting the first and second wavelength light or by a first and a second laser. By way of an optical coupler, the first wavelength light and the second wavelength light are coupled into an interferometer cavity, e.g. a Fabry-Pérot interferometer cavity. An interferometer detector is coupled to the interferometer cavity and configured to provide an interference measurement signal based on detected interference patterns of interferometric first and second wavelength light generated by the interferometer cavity. A demodulator unit is configured to generate a first demodulation signal based on the interference measurement signal by demodulation with the first modulating frequency and a second demodulation signal based on the interference measurement signal by demodulation with the second modulating frequency. A computation unit is configured to compute an absolute distance (or position) by evaluating the first demodulation signal acquired during a sweep of the first tunable frequency and by evaluating the second demodulation signal.

According to one aspect, a frequency sweep control unit is configured to sweep the first tunable frequency over a first frequency interval. The frequency sweep control unit may be configured to control a variation of the temperature of the first tunable light source in order to sweep the first tunable frequency.

According to one aspect, the second light source is (also) a tunable light source, i.e. the second frequency is a second tunable frequency. The tunability of the second light source may, according to one aspect, be used for correction of nonlinearities of phase values derived by evaluating the second wavelength light. Further, the tunability of the second light source may be used for determining an absolute distance or to increase the accuracy of the determination of the absolute distance.

DESCRIPTION OF THE DRAWINGS

The accompanying drawings are included to provide a further understanding of implementations. The drawings illustrate example implementations and, together with the description, serve to explain principles of implementations. Other implementations and many of the intended advantages will be readily appreciated as those become better understood by reference to the following detailed description. The elements of the drawings are not necessarily to scale and relative to each other. Like reference numerals designate corresponding similar parts.

DETAILED DESCRIPTION

It is to be understood that the features of the various exemplary implementations described herein may be combined with each other unless specifically noted otherwise. More particularly, the features of the implementation illustrated in FIG. 1 and FIG. 2 may be combined, and FIG. 2 may optionally be understood as a more detailed implementation of the device 100 of FIG. 1. Further, in the following, two approaches for evaluating measurement data and computing an absolute distance are exemplified by way of example, namely the Synthetic Wavelength Approach (SWA) and the Combinatory Fringe Number Approach (CFNA). These two approaches may, e.g., be combined. By way of example, the computation of a coarse absolute distance or an intermediate absolute distance by the SWA may be used to determine the range of possible fringe number combinations in the CFNA. Other examples for combing these two approaches are also possible and covered by the disclosure herein.

In the following, the interferometry as used herein for position or absolute distance measurements is described by way of example for a Fabry-Pérot interferometer using a Fabry-Pérot interferometer cavity. However, any type of interferometer and interferometer cavity may be used.

Figure 1:
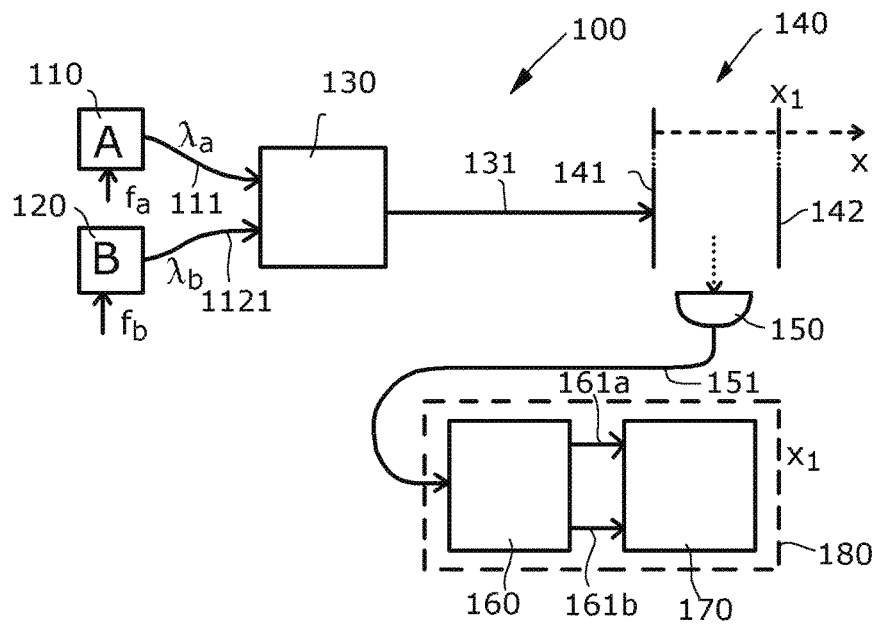
FIG. 1 is a schematic illustration of a device 100 for absolute distance measurement.

Referring to FIG. 1, a device 100 for absolute distance measurement is illustrated. The device 100 may comprise a first tunable light source 110 denoted by A and a second light source 120 denoted by B. The first tunable light source 110 may be configured to emit a first wavelength $\lambda_a$ light of a first tunable frequency and the second light source 120 may be configured to emit a second wavelength $\lambda_b$ light of a second frequency. The first wavelength light may be modulated by a first modulating frequency $f_a$ and the second wavelength light may be modulated by a second modulating frequency $f_b$. The first modulating frequency $f_a$ and the second modulating frequency $f_b$ are different. In the following, the indices a, b are used to distinguish between quantities related to the first tunable light source 110 (light source A) and the second light source 120 (light source B), respectively.

The first light of the first tunable light source 110 may be guided to an optical coupler 130 by, e.g., an optical fiber 111, and the second light emitted from the second light source 120 may be guided to e.g. the same optical coupler 130 by, e.g., an optical fiber 121. The optical coupler 130 may be configured to superimpose the first light and the second light. The superimposed first and second light may be guided via, e.g., an optical fiber 131 to a Fabry-Pérot interferometer cavity 140. All optical fibers 111, 121, 131 may e.g. be SMFs (single mode fibers).

The Fabry-Pérot interferometer cavity 140 may comprise a first resonator mirror 141 and a second resonator mirror 142. The first resonator mirror 141 may be semi-transparent and retro-reflects a portion of the incident light. The other portion traverses the first resonator mirror 141 and the resonator cavity and is reflected at the second resonator mirror 142. Depending on the specific type of the Fabry-Pérot interferometer cavity 140, the reflected light is either partially passed by the first resonator mirror 141 back into the optical fiber 131 or is reflected back into the resonator cavity for one or more other back and forth passes through the resonator. In the following the number of (back and forth) passes through the resonator is denoted by p.

In particular, the Fabry-Pérot interferometer cavity 140 may be configured as a confocal Fabry-Pérot interferometer cavity as described, e.g., in EP 2 363 685 A1. A confocal Fabry-Pérot interferometer cavity 140 may use p=2 or greater. Further, the confocal property of such interferometer resonator is largely independent of the tilt angle of the second resonator mirror 142. Since the second resonator mirror 142 may be coupled to an object to be displaced, the stability against misalignment, which may be caused, e.g., by vibration or movement of the object, may be an important property in many applications, in particular, if long range displacement paths of an object are to be monitored. The disclosure of EP 2 363 685 A1 relating to a confocal Fabry-Pérot interferometer for displacement paths greater than some millimeters or centimeters is incorporated into the specification herein by way of reference.

The device 100 may further comprise an interferometer detector 150 coupled to the Fabry-Pérot interferometer cavity 140 and configured to provide at last one interference measurement signal 151 based on a detected interference pattern. The interferometer detector 150 may, e.g., be coupled to the optical fiber 131, in which light reflected by the Fabry-Pérot interferometer cavity 140 is available. The light reflected by the Fabry-Pérot interferometer cavity 140 may result from a superimposition of the light reflected by the first resonator mirror 141 on the light reflected by the second resonator mirror 142. In this case, superimposition may occur at the first resonator mirror 141. In other embodiments the interferometer detector 150 may be coupled to the Fabry-Pérot interferometer cavity 140 to detect the light transmitted by the Fabry-Pérot interferometer cavity 140. In both and other possible cases, the interference measurement signal 151 provided by the interferometer detector 150 is based on a detected interference pattern of interferometric light output from the Fabry-Pérot interferometer cavity 140.

The device 100 may further comprise an evaluation circuit 180. The evaluation circuit 180 may comprise a demodulator unit 160 and a computation unit 170. The interferometer detector 150 may be coupled to the demodulator unit 160 for feeding the interference measurement signal 151 into the demodulator unit 160. The demodulator unit 160 may be configured to generate a first demodulation signal 161a associated with the first modulating frequency $f_a$ and a second demodulation signal 161b associated with the second modulating frequency $f_b$. Thus, whilst the first tunable light source 110 modulated with the first modulating frequency $f_a$ and the second light source 120 modulated with second modulating frequency $f_b$ in combination with the optical coupler 130 provide for "frequency division multiplexing", the demodulator unit 160 provides for "frequency division de-multiplexing". As will be explained further below in more detail, the first demodulation signal 161a recovers the phase $\Phi_a$ between the measurement light of the first laser 110 reflected by the (movable) second resonator mirror 142 and the reference light of the first light source 110 reflected by the first resonator mirror 141. Analogously, the second demodulation signal 161b recovers the phase $\Phi_b$ between the measurement light of the second laser 120 reflected by the (movable) second resonator mirror 142 and the reference light of the second light source 120 reflected by the first resonator mirror 141.

The first demodulation signal 161a and the second demodulation signal 161b may be fed into the computation unit 170. The computation unit 170 may be configured to compute an absolute distance $x_1$ by evaluating the first demodulation signal 161a acquired during a sweep of the first tunable frequency and by evaluating the second demodulation signal 161b. Further, if the second light source is tunable, the computation unit 170 may be configured to compute the absolute distance $x_1$ by further evaluating the second demodulation signal 161b acquired during a sweep of the second tunable frequency.

As will be explained in more detail in the following, the computation of the absolute distance $x_1$ may be performed without the use of any reference length or length standard which, in conventional techniques, may be necessary to obtain an absolute distance measurement. Further, no (second) reference interferometer is needed to obtain the absolute distance measurement. By using the technique of frequency division multiplexing in combination with an interferometer cavity, e.g. a Fabry-Pérot interferometer cavity, a very simple, robust and inexpensive apparatus is feasible without the need of using, e.g., optical filters, cavity beam splitters, a high number of interferometer detectors, etc.

Figure 2:
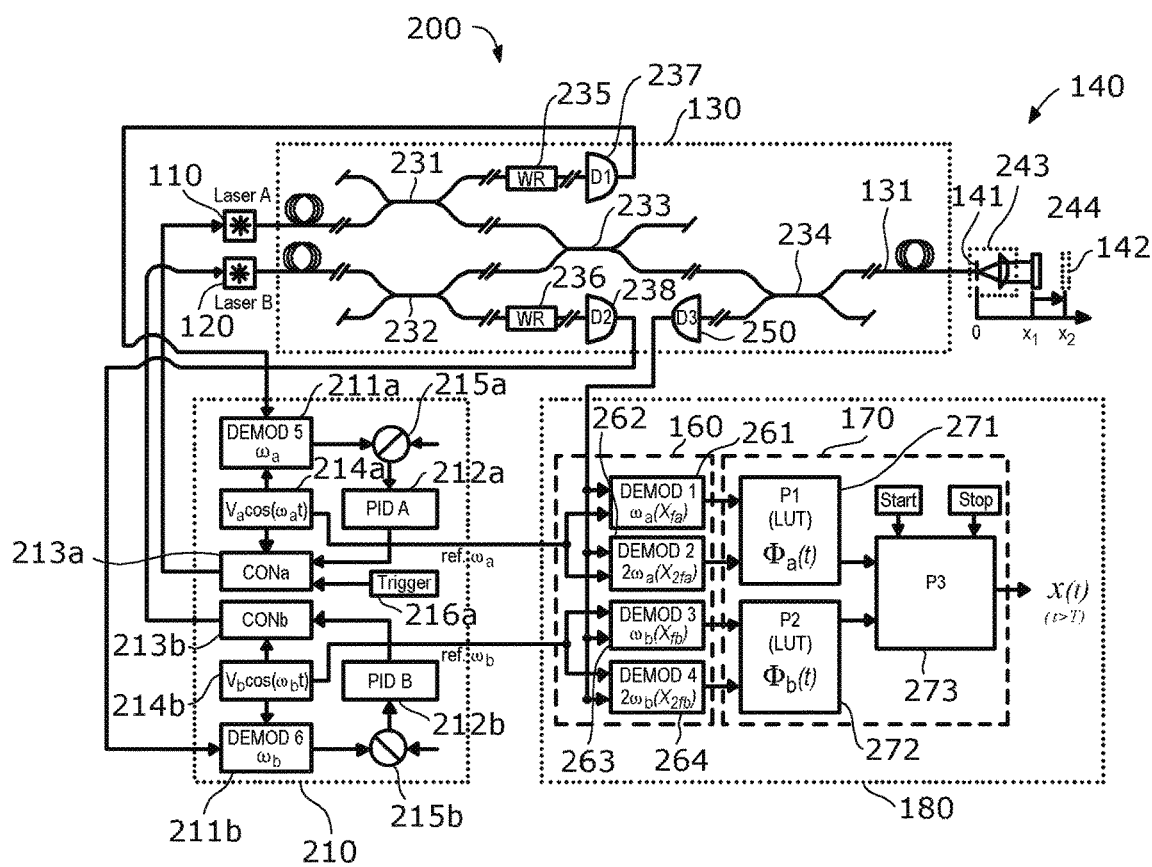
FIG. 2 is a more detailed schematic illustration of a device 200 for absolute distance measurement.

FIG. 2 illustrates an exemplary device 200 for absolute distance measurement. In relation to device 100, more specific implementations of the first tunable light source 110, the second light source 120, the optical coupler 130, the Fabry-Pérot interferometer cavity 140, the interferometer detector 150, the demodulator unit 160, and the computation unit 170 are illustrated by way of example in FIG. 2. It is to be noted that these more specific units are merely exemplary and may be selectively combined with or incorporated into device 100. Further, the device 200 may comprise a laser control circuitry 210. Generally, a control circuitry (not shown) having one or more of the functions of the laser control circuitry 210 could also be used to control the first tunable light source 110 and the second light source 120 in device 100.

The first and second light sources 110, 120 may be implemented by one or more lasers, e.g. diode lasers A and B, respectively. The optical coupler 130 may, e.g., comprise a first coupler 231, a second coupler 232, a third coupler 233, and/or a fourth coupler 234. First laser 110 (laser A) may be connected to the first coupler 231 and second laser 120 (laser B) may be connected to the second coupler 232. The first coupler 231 and the second coupler 232 may each provide an output to the third coupler 233, which may provide for frequency division multiplexing. A further output of the first coupler 231 may be connected to a first gas cell 235 and a further output of the second coupler 232 may be connected to a second gas cell 236. An output of the third coupler 233 may be connected via, e.g., the fourth coupler 234 to an input of an interferometer head 243 of the Fabry-Pérot interferometer cavity 140. The interferometer head 243 may be coupled to the output of the fourth coupler 234 by the optical fiber 131, e.g. a SMF.

The interferometer head 243 may comprise the first resonator mirror 141 and, e.g., a collimator 244. The first resonator mirror 141 may, e.g., be formed by the light exit surface of the core of the optical fiber 131 leading to the interferometer head 243. The collimator 244 may provide for a parallel light beam in the resonator cavity 140. The second resonator mirror 142 may be movable and is shown to be displaced from absolute distance $x_1$ to absolute distance $x_2$. The zero point of absolute distance measurement may be defined by the first resonator mirror 141. The interference takes place at the first resonator mirror 141, e.g. at the light exit surface (end face) of the optical fiber 131.

The first laser 110 and the second laser 120 may both be stabilized lasers. Further, one or both of these lasers 110, 120 may be tunable to allow a frequency sweep from a frequency sweep start frequency to a frequency sweep end frequency. And still another aspect is that each of the lasers 110 and 120 are modulated in order to allow frequency division multiplexing for recovering laser specific phase information from the light reflected from the Fabry-Pérot interferometer cavity 140. These aspects, by way of example, are now described for the first laser 110. The same may apply for the second laser 120, however, reiteration is omitted for the sake of brevity.

The frequency band defined by the tuning range of the first tunable frequency corresponding to wavelength $\lambda_a$ is spaced apart from the second frequency corresponding to wavelength $\lambda_b$. If the second frequency is also a tunable frequency, the second frequency band defined by the tuning range of the second tunable frequency may be spaced apart from the first frequency band of the first tunable frequency, i.e. both frequency bands may be non-overlapping.

The wavelength $\lambda_a$ emitted by the first laser 110 may be controlled by a feedback circuitry. By way of example, the laser control circuitry 210 may comprise a demodulator (DEMOD 5) 211a, a controller (PID A) 212a, a wavelength control unit (CONa) 213a, an oscillator 214a and, e.g., a comparator 215a. The oscillator 214a may generate the first modulating frequency $\omega_a = 2\pi f_a$. The demodulator 211a demodulates a signal received from the first detector 237 (e.g. a gas cell photo-diode) using the first modulating frequency $\omega_a$. Thus, the demodulator 211a provides the feedback process variable by demodulating the signal from the first detector 237. The comparator 215a may compare the process variable with a set point (e.g. 0) and outputs the difference thereof. The controller 212a may calculate a control signal which may be routed to the wavelength control unit 213a. The wavelength control unit 213a controls the laser wavelength. By way of example, laser wavelength control may comprise controlling laser current or laser temperature or both. By way of example, the frequency sweep of the first laser 110 may be based on the control of the laser temperature, i.e. the laser wavelength control may be configured to provide for controlled temperature ramping. The laser wavelength stabilization (which may also be performed during the frequency sweep) may be based on the control of the laser current. Further, laser current modulation may be used to modulate the laser wavelength $\lambda_a$ by the first modulating frequency $\omega_a$.

The laser control circuitry 210 may further comprise a demodulator (DEMOD 6) 211b, a controller (PID B) 212b, a wavelength control unit (CONb) 213b, an oscillator 214b and a comparator 215b. These units may be functionally equivalent to the corresponding units 211a, 212a, 213a, 214a and 215a, respectively, and reference is made to the above description in order to avoid reiteration. Thus, demodulator 211b may receive a signal from the second detector (e.g. gas cell photo-diode) 238, and oscillator 214b may generate the second modulating frequency $\omega_b = 2\pi f_b$.

The laser control circuitry 210 may further comprise a trigger 216a for triggering a frequency sweep operation of the first laser 110. A corresponding trigger (not shown) may be included in the laser control circuitry 210 if a frequency sweep operation shall also be performed by the second laser 120. Further, if the second laser 120 is also configured to perform a frequency sweep, the temperature control of the second laser 120 may, e.g., also need to provide for controlled temperature ramping, otherwise not.

Implementations of the laser control circuitry 210 different from the implementation shown in FIG. 2 are possible. Generally, the laser control circuitry 210 may provide for two feedback loops locking both lasers 110, 120 to different frequencies of a wavelength reference. If one or more gas cells 235, 236 are used as wavelength references, both lasers 110, 120 may be locked to different absorption lines of the gas or gases contained in the gas cells 235, 236. These laser stabilization feedback loops may be operated continuously on the basis of a laser current control. A frequency sweep may be performed by raising the temperature at the respective laser 110, 120 from a first temperature to a second temperature. Further, laser wavelength modulation may be performed by laser current modulation of the laser current controlled by the respective laser stabilization feedback loop.

Figure 3:
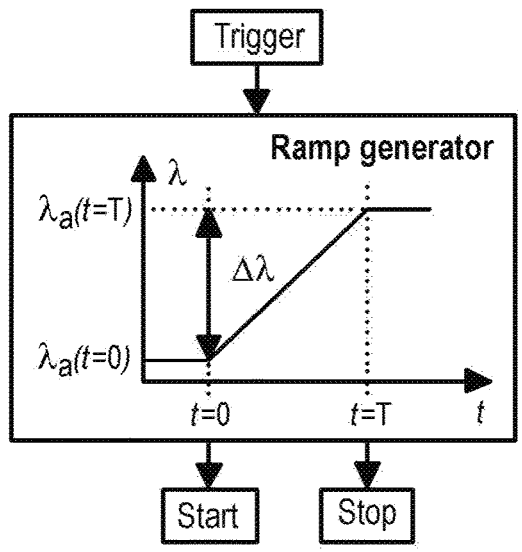
FIG. 3 is a graph illustrating wavelength sweep by sweeping the first tunable frequency of the first tunable light source.
Figure 6:
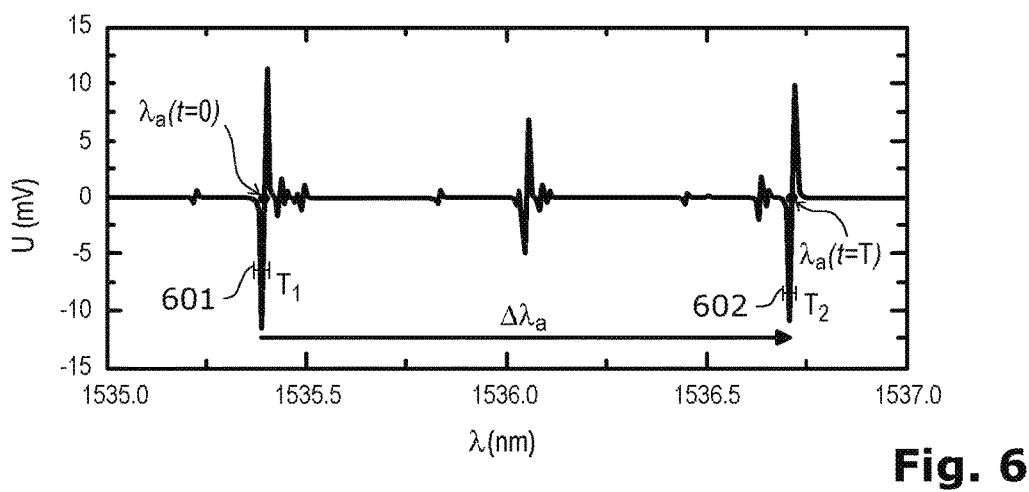
FIG. 6 is a graph illustrating a schematic demodulation signal U obtained by a frequency sweep between different absorption lines of a gas in a gas cell.

FIGS. 3 and 6 illustrate, by way of example, how a frequency sweep of the lasers 110, 120 may be performed. By way of example, the first laser 110 is considered for explanatory purposes. The start time t=0 of the frequency sweep is, e.g., triggered by trigger 216*a*.

Starting at frequency sweep start time t=0 and continuing until frequency sweep end time t=T, the laser temperature of laser 110 is controlled to change from $T_1$ to $T_2$. The temperature difference $T_2-T_1$ between $T_2$ and $T_1$ may, e.g., be equal to or greater than 5° C., 10° C., or, e.g., 14° C. as used by way of example in FIG. 6.

In order to produce a defined wavelength shift, the laser wavelength $\lambda_a$ is locked to different absorption lines of the first molecular absorption gas cell 235 during the sweep. FIG. 6 exemplarily shows the wavelength sweep demodulation signal of an acetylene 12 molecular absorption gas cell when changing the temperature from $T_1$ to $T_2$. The laser temperature control can hold the laser wavelength within the temperature control interval 601 at temperature $T_1$ and the temperature control interval 602 at temperature $T_2$, but e.g. not within the acquired wavelength accuracy. For this reason, the wavelength may be locked on, e.g., a 0 V demodulation signal by means of the feedback loop explained above. This feedback loop controls the more sensitive laser current, thus locking the wavelength to an absorption line and thereby achieving a stability of the laser wavelength $\lambda_a$ and $\lambda_b$ at each absorption line in the order of e.g. $\delta\lambda/\lambda=10^{-7}$. It is to be noted that the wavelength references (e.g. the gas cells 235, 236) may not only be used to stabilize the laser wavelengths $\lambda_a$, $\lambda_b$, respectively, but may also provide an absolute wavelength calibration reference. That way, the laser wavelengths $\lambda_a$ and $\lambda_b$ can be defined as the absorption wavelength which are well-known.

By way of example, the first laser 110 (laser A) could be locked to absorption line R17 of acetylene 12 having a wavelength of 1516.44130 nm and the second laser 120 (laser B) could be locked to absorption line P17 of acetylene 12 having a wavelength of 1535.3928 nm Another possibility is to lock the first laser 110 to the aforementioned absorption line R17 of acetylene 12 and to lock the second laser 120 to the absorption line P18 of acetylene 13 having a wavelength of 1543.6237 nm. In both and other cases, the wavelength sweep range of the first laser 110 or, if used, the wavelength sweep range of the second laser 120, is significantly smaller than the wavelength distance between the absorption lines to which the respective lasers 110, 120 are locked.

The demodulator unit 160 may comprise a first demodulator (DEMOD 1) 261 and a second demodulator (DEMOD 2) 262. Demodulator 261 and demodulator 262 may be coupled to the oscillator 241*a* generating the first modulating frequency $\omega_a$. The first demodulator 261 may be configured to demodulate the measurement signal provided by interferometer detector (D3) 250 (which corresponds to interferometer detector 150 of FIG. 1) with the first modulating frequency $\omega_a$, and the second demodulator 262 may be configured to demodulate the measurement signal with a harmonic of the first modulating frequency, e.g. with $2\omega_a$. Thus, by way of example, the first and second demodulators 261, 262 may be coupled to an output of the oscillator 214*a*.

The demodulator unit 160 may further comprise a third demodulator (DEMOD 3) 263 and a fourth demodulator (DEMOD 4) 264. The third demodulator 263 and the fourth demodulator 264 may be coupled to an output of the oscillator 214*b*. The third demodulator 263 may be configured to demodulate the interference measurement signal with the second modulating frequency $\omega$ and the fourth demodulator 264 may be configured to demodulate the interference measurement signal with a harmonic of the second modulating frequency, e.g. with $2\omega_b$.

Thus, a quadrature detection method may be employed, where the first demodulator 261 produces a demodulation signal associated with the first laser wavelength and the second demodulator 262 produces a demodulation signal associated with the first laser wavelength shifted by 90°. These two demodulated signals may be routed to e.g. a first processor (P1) 271 of the computation unit 170. The first processor 271 may be configured to recover the interferometric phase $\Phi_a$ associated with the first laser wavelength $\lambda_a$ based on the outputs of the first and second demodulators 261, 262. To this end, the first processor 271 may e.g. access the look-up table memory (LUT) which may be applied to correct the (measured) real phase computed by the first processor 271 by their nonlinearities. The phase correction of the real phases by their nonlinearities will be explained further below. The first processor 271 may output a time-dependent phase $\Phi_a(t)$ of the interference pattern related to the first wavelength $\lambda_a$.

The third demodulator 263 and the fourth demodulator 264 are configured to operate in accordance with the disclosure concerning the first demodulator 261 and the second demodulator 262, except that the second laser frequency $\omega$ is used instead of the first laser frequency $\omega_a$. The output of the third demodulator 263 and the output of the fourth demodulator 264 may be passed to, e.g., a second processor (P2) 272 of the computation unit 170. The second processor 272 is configured to compute a time-dependent phase $\Phi_b(t)$ based on the outputs of the third and fourth demodulators 263, 264. Again, a look-up table (LUT) may e.g. be accessed by the second processor 272 in order to correct the calculated real phase for nonlinearity included therein.

The computation unit 170 may derive the time-dependent absolute distance x(t) based on the phases $\Phi_a(t)$ and $\Phi_b(t)$. By way of example, the phases $\Phi_a(t)$ and $\Phi_b(t)$ are passed to a third processor 273 (P3) of the computation unit 170. The third processor 273 may be configured to derive the time-dependent absolute distance x(t). As will be described in more detail below, a plurality of methods and variations thereof are available to calculate the absolute distance x(t). In each of these methods, at least one frequency sweep (e.g. a frequency sweep of the first laser 110) is needed. Further, at least in some of these methods, also a frequency sweep of the second laser 120 is performed.

In the following, the principle of absolute distance measurement is explained. First, only one laser (e.g. the first laser 110 or the second laser 120) is considered, and indices a, b are omitted for ease of notation. The intensity (e.g. optical power) of the sinusoidal interference pattern created by the Fabry-Pérot interferometer cavity 140 can be approximated by the equation:

$$I(\Phi)=I_0(1+V\cos(\Phi)), \quad (1)$$

where V is the interference contrast, $I_0$ is the average optical power and $\Phi$ is the optical phase delay between the measurement light reflected by the (movable) second resonator mirror 142 and the reference light reflected by the first resonator mirror 141. This phase delay Φ, also referred to as phase in the following, is given by:

$$\Phi = 4\pi p n x / \lambda, \quad (2)$$

where x is the actual cavity length (denoted in FIG. 1 by $x_1$), λ is the laser wavelength, n is the refractive index of the medium inside the interferometer cavity 140, and p denotes whether the measurement mode is single pass (p=1) or double pass (p=2), or else.

The displacement Δx of the moving second resonator mirror 142 (or, more generally, the length change of the resonator) is directly proportional to the phase change ΔΦ according to:

$$\Delta x = (\lambda / 4\pi p n) \Delta \Phi. \quad (3)$$

Still considering only one laser, the interferometer cavity length may be obtained by sweeping the wavelength λ of this laser and measuring the corresponding phase change ΔΦ. The optical path difference $x_{fti}$ between measurement light and reference light is proportional to the phase difference $\Delta\Phi_{fti}$ measured when changing the laser emission frequency from $\nu_{max}$ to $\nu_{min}$ and indirectly proportional to the frequency spacing $\Delta\nu_{fti} = \nu_{max} - \nu_{min}$ according to:

$$x_{fti} = \Delta\Phi_{fti} c / (4\pi p n \Delta\nu_{fti}), \quad (4)$$

where c is the velocity of light. Equation (3) shows that a very large tuning range is needed to reduce the total error δx/x to equal to or smaller than about $10^{-7}$ or $10^{-8}$, which can be reached in accordance with the disclosure herein. A laser with sufficient large tuning range could be too expensive for most commercial purposes. The tuning range $\Delta\lambda_{fti}$ of today's lower cost but still accurate semiconductor diode lasers is typically in the order of about $\delta\lambda/\lambda = 10^{-3}$. By way of example, semiconductor diode lasers 110, 120 having a tuning range $\Delta\lambda_{fti}$ of, e.g., equal or smaller than $8\lambda/\lambda = 10^{-2}$ or $10^{-3}$ may be used in accordance with the disclosure herein.

Thus, if using only one laser, the repeatability of the wavelength sweep measurement, which is important to find a certain position again, would be limited to an accuracy δx/x in the order of $10^{-4}$ due to several error sources. One error sources are periodic nonlinearities, meaning that the measured displacement is not directly proportional to the actual displacement, but there are deviations that repeat periodically with a distance proportional to the wavelength. Such phase deviations may be periodic in 2π or 4π, depending on the reflector alignment. The 2π periodic nonlinearities may be caused by multiple reflection of the laser beam inside the interferometer cavity 140 and by a non-sinusoidal transfer function of the wavelength modulation, whereas the 4π periodic nonlinearities may be caused by double modulation which is due to a reflector misalignment, meaning that one part of the light traverses the cavity once and the other part traverses it twice. Other error sources are wavelength uncertainties which may, e.g., depend on the laser wavelength stabilization feedback loop, and phase noise mainly caused by parasitic cavities inside the optical fiber circuit.

Further, a significant measurement error may be produced by cavity drifts during the frequency sweep (which is also referred to as wavelength sweep in the following). The error of the wavelength sweep measurement $\delta x_{fti}$ is given by:

$$\delta x_{fti} = (\lambda / \Delta\lambda_{fti}) \delta x_{drift}, \quad (5)$$

where λ is the central laser wavelength, $\Delta\lambda_{fti}$ is the wavelength shift of the wavelength sweep and $\delta x_{drift}$ is the cavity drift during the wavelength sweep. Equation (5) indicates that a cavity drift may have a high contribution to the total measurement error as it is multiplied with the ratio of the absolute wavelength λ to the wavelength change $\Delta\lambda_{fti}$, which is typically in the order of about $10^3$. Therefore, it is important to correct for cavity drifts occurring during the wavelength sweep.

To correct for cavity drifts, the second laser 120 (e.g. laser B) may be used. The phase shift due to the wavelength change of laser A corrected by cavity drifts is given by:

$$\Delta\Phi_{a,fti,corr} = \Delta\Phi_{a,fti} - (n_a \lambda_b / n_b \lambda_a) \Delta\Phi_b, \quad (6)$$

where $\Delta\Phi_{a,fti}$ is the measured phase shift of the first laser 110 (i.e. laser A), $n_a$ is the refractive index at wavelength $\lambda_a$, $n_b$ is the refractive index at wavelength $\lambda_b$ and $\Delta\Phi_b$ is the phase change due to cavity drifts, which is measured with the second laser 120 (i.e. laser B). The absolute distance corrected by cavity drifts is then given by:

$$x_{fti} = \Delta\Phi_{a,fti,corr} c / (4\pi p n_a \Delta\nu_{a,fti}), \quad (7)$$

where $\Delta\nu_{a,fti}$ is the frequency tuning range of the first laser 110 during the frequency sweep.

It is to be noted that the cavity drift correction disclosed herein may be based only on the usage of a second laser 120. Neither a reference or standard length nor a second interferometer (i.e. a reference interferometer for measuring the reference or standard length) needs to be used for the cavity drift correction.

From a mathematical point of view, the problem to compute an absolute distance would now be solved at this point, see e.g. equation 7. However, in reality, the measured values of $\Delta\Phi_{a,fti}$ and $\Delta\Phi_b$ may not be exact, and therefore, $x_{fti}$ may merely provide for a coarse estimation of the absolute distance $x_1$.

Quadrature Detection Method

In the following, a quadrature detection method is disclosed by way of example. The demodulator unit 160 may process the interferometer measurement signal from interferometer detector 150, 250 in accordance with a quadrature detection method. More specifically, a quadrature detection method may be applied to each of the interference signals observed in the Fabry-Pérot interferometer cavity 140 associated with one laser. The following description is therefore applicable to each of the first wavelength light and the second wavelength light, and indices are omitted for ease of notation.

When the displacement of the second resonator mirror 142 exceeds one fringe, a quadrature detection method may detect both the displacement and its direction with constant sensitivity. In a quadrature detection method two signals phase-shifted by 90° are used to recover the interferometric phase Φ.

As already mentioned, the quadrature signal may here be generated by demodulating a high frequency carrier measurement signal which is produced by modulating the laser wavelength with a frequency ω=2πf. As mentioned above, this may be achieved by modulating the laser current. The modulation depth β, given by:

$$\delta\Phi = -(4\pi p n x / \lambda^2) \delta\lambda := \beta, \quad (8)$$

linearly depends on the cavity length x.

According to equation (1), the laser wavelength modulation induces a modulation in the detector signal described by:

$$I(\Phi) = I_0 (1 + V \cos((\beta \sin \omega t + \Phi)). \quad (9)$$

The detector intensity I(Φ) can be split into a sine and a cosine term by means of the Bessel functions $J_i(\beta)$ indicating the modulation amplitudes at harmonics of the carrier frequency ω.

$$I = I_{DC} + I_\omega + I_{2\omega} + \ldots, \quad (10)$$

with $I_{DC} = I_0 + I_0 V J_0(\beta)\cos(\Phi)$, $I_\omega = -I_0 V J_1(\beta)\sin(\omega t)\sin(\Phi)$, and $I_{2\omega} = I_0 V J_2(\beta)\cos(2\omega t)\cos(\Phi)$.

Demodulation of these intensity signals at their modulation frequency leads to the time independent equations:

$$I_{DC} = I_0 + I_0 V J_0(\beta)\cos(\Phi), \; I_{\omega,demod} = -I_0 V J_1(\beta)\sin(\Phi),$$
$$\text{and } I_{2\omega,demod} = I_0 V J_2(\beta)\cos(\Phi). \quad (11)$$

There are various methods for recovering the phase Φ. According to a first exemplary method, the phase Φ may be recovered by using the detector DC signal $I_{DC}$ and the signal $I_{\omega,demod}$ given by demodulating the detector signal at the fundamental frequency co. According to a second method, the signals $I_{\omega,demod}$ and $I_{2\omega,demod}$ given by demodulation at the fundamental frequency ω and its first harmonic 2ω may be used:

$$\Phi = \arctan(J_2(\beta) I_{\omega,demod} / -J_1(\beta) I_{2\omega,demod}) \quad (12)$$

The absolute distance x is related to the phase Φ by:

$$x = (\lambda/2p)(N + (1/2\pi)\Phi). \quad (13)$$

To recover the phase information of both lasers 110, 120, the phase information is encoded by the modulation frequency of the laser, because the detector DC signals are superimposed and thus cannot be used as a quadrature signal component. As a consequence, both lasers have to be modulated with different frequencies, i.e. $\omega_a \neq \omega_b$. Using this frequency division multiplexing method, both phases may then be recovered according to equation (12), i.e. using the relations:

$$\Phi_a = \arctan(J_2(\beta) I_{\omega a,demod} / -J_1(\beta) I_{2\omega a,demod}) \text{ and}$$
$$\Phi_b = \arctan(J_2(\beta) I_{\omega b,demod} / -J_1(\beta) I_{2\omega b,demod}) \quad (14)$$

To determine the Bessel functions, one would need to know the distance x, which is, however, unknown. For that reason, the demodulator output signals are normalized using the results of the wavelength sweeps:

$$S = X_{2f}/X_{2f,max} \text{ and } SQ = X_f/X_{f,max} \quad (15)$$

In this equation, $X_{2f}$ is the demodulator output signal of the second and fourth demodulators 162, 264, and $X_f$ is the demodulator output signal of the first and third demodulators 261, 263, respectively. In the following S will also be referred to as in-phase demodulation signal and SQ will also be referred to as quadrature demodulation signal. The phase Φ may then be given by the arctangent of the normalized quadrature and in-phase demodulation signals, e.g. by:

$$\Phi = \arctan(SQ/S). \quad (16)$$

The normalization of equation (15) may e.g. be performed in the demodulator unit 160 or in the computation unit 170.

Cavity Drift Compensation

Figure 4A:
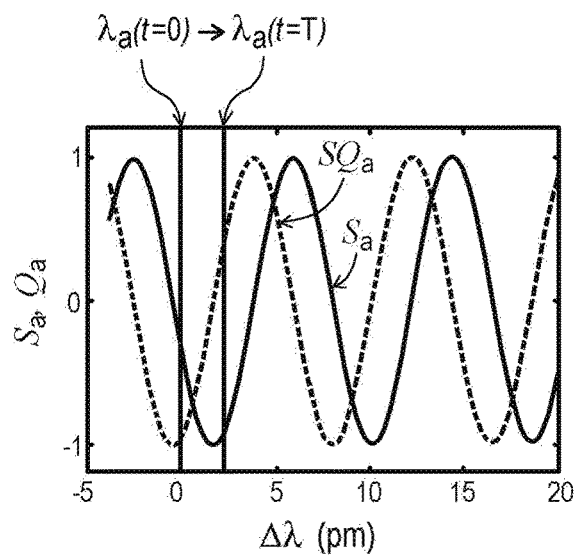
FIG. 4A is a graph illustrating a schematic signal change of a measurement signal $S_a$ and a quadrature measurement signal $SQ_a$ during a frequency sweep of the first tunable light source.
Figure 4B:
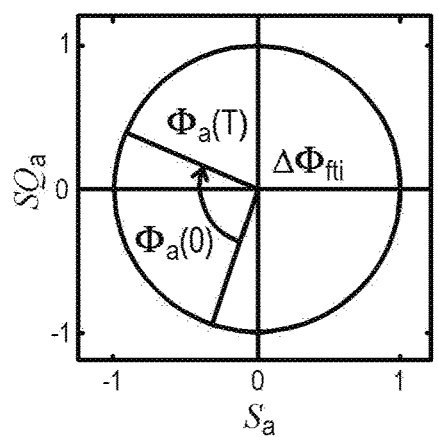
FIG. 4B is a graph illustrating a schematic phase change during the frequency sweep of FIG. 4A.

FIG. 4A illustrates the in-phase demodulation signal $S_a$ and the quadrature demodulation signal $SQ_a$ for the first laser 110 during a wavelength sweep from $\lambda_a(t=0)$ to $\lambda_a(t=T)$. By way of example, a wavelength sweep over about $\Delta\lambda_a = 2$ pm is shown. FIG. 4B illustrates the corresponding phase change of the first laser light reflected from the Fabry-Pérot interferometer cavity 142 during the wavelength sweep of the first laser 110 as represented by a Lissajous figure. This phase change is, inter alia, due to the wavelength change and a cavity drift.

Figure 5A:
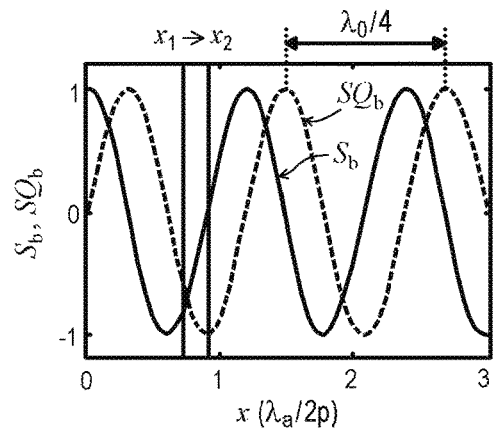
FIG. 5A is a graph illustrating the schematic signal change of a measurement signal $S_b$ and a quadrature measurement signal $SQ_b$ when the cavity drifts during a wavelength sweep of the first tunable light source.
Figure 5B:
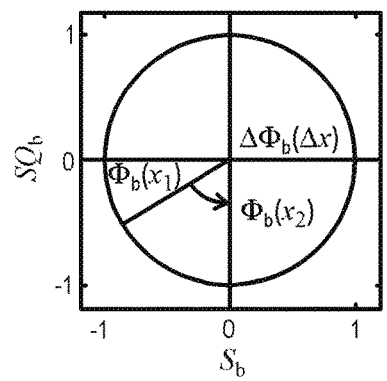
FIG. 5B is a graph illustrating a schematic phase change when the cavity drifts during the wavelength sweep of the first tunable light source of FIG. 5A.

FIG. 5A illustrates the in-phase and quadrature demodulation signals $S_b$ and $SQ_b$ associated with the reflected light of the second laser 120 when the cavity drifts from $x_1$ to $x_2$ during the wavelength sweep of the first laser 110. In this case, the second wavelength $\lambda_b$ of the second laser 120 is kept constant during the wavelength sweep $\lambda_a(t=0)$ to $\lambda_a(t=T)$ of the first laser 110. FIG. 5B illustrates the phase change detected on the reflected light of the second laser 120 when the cavity drifts from $x_1$ to $x_2$ during the wavelength sweep of the first laser 110. Thus, $\Delta\Phi_b(\Delta x)$ as shown in FIG. 5B is based on the cavity drift.

The second laser 120 may thus be used to track the cavity drift during the frequency sweep of the first laser 110. This allows to compute the phase shift due to the wavelength sweep corrected by cavity drifts as set out in equation (6). Equation (7) may then be used to compute the absolute distance $x_{fti}$ corrected by cavity drifts.

As mentioned above, equation (7) only provides for a coarse estimate of the absolute distance, because the input phase shift quantities of equation (6) are, in reality, subjected to errors.

Correction of Nonlinearities

Figure 9:
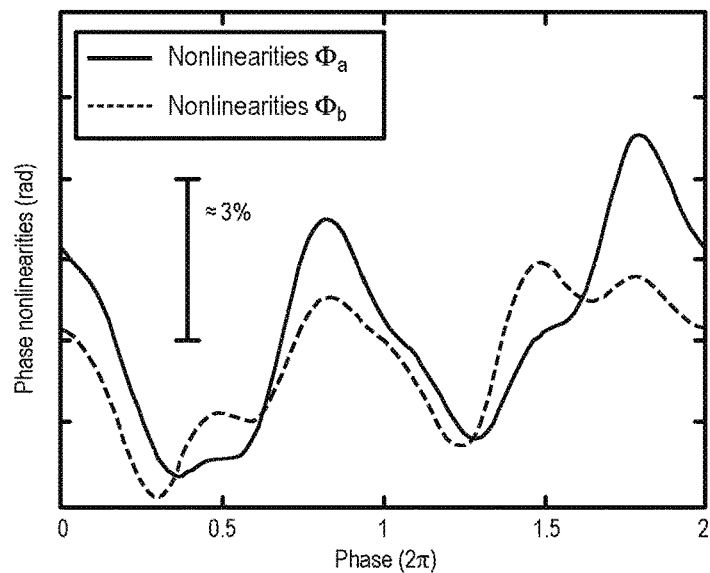
FIG. 9 is a graph illustrating $4\pi$ periodic nonlinearity curves of $\Phi_a$ and $\Phi_b$ obtained from a frequency sweep of the first tunable light source and a frequency sweep of the second tunable light source.

A possible error of the phase shift quantities of equation (6) is caused by periodic nonlinearities of the phase computed from the demodulation signals S, SQ. The nonlinearities or phase deviations may have a period of 2π or 4π. FIG. 9 illustrates these nonlinearities of a 110 mm length cavity measured for both laser 110, 120. The data are obtained by linearly sweeping the laser wavelength of each laser 110, 120 and subtracting a moving average from the measured phase change data.

The periodic nonlinearities taken from a wavelength sweep of both lasers can be used to correct both phases $\Phi_a$ and $\Phi_b$. Phase data corrected by the nonlinearities shown in FIG. 9 may be stored in the LUT of processor 271 for the first laser light and in the LUT of processor 272 for the second laser light.

The periodic nonlinearities of $\Phi_a$ and the periodic nonlinearities of $\Phi_b$ may be obtained by two wavelength sweeps of the first and second lasers 110 and 120, respectively. These two wavelength sweeps are denoted in the following by CP1 (correction process 1) and CP2 (correction process 2), respectively. CP1 and/or CP2 may be performed for initial adjustment of the device, i.e. prior to regular device operation.

In CP1 a wavelength sweep of the first laser 110 may be performed from $\lambda_{a,min}$ to $\lambda_{a,max}$. The phases $\Phi_a$ and $\Phi_b$ are recorded and a continuous cavity drift correction may be performed by:

$$\Delta\Phi_{a,corr} = \Delta\Phi_a - (n_a \lambda_b / n_b \lambda_a)\Delta\Phi_b. \quad (17)$$

Then, the $\Phi_a$ data may be smoothed by using a moving average filter, and the smoothed $\Phi_a$ data may be subtracted from the $\Phi_a$ data. The phase nonlinearities of $\Phi_a$ derived that way may then be used to correct the linear phase data stored in LUT of the first processor 271. That is, CP1 may be used to overwrite initial linear phase data stored in the LUT by corresponding phase-corrected phase data.

In CP2 a wavelength sweep of the second laser 120 may be performed from $\lambda_{b,min}$ to $\lambda_{b,max}$. The phases $\Phi_a$ and $\Phi_b$ are recorded and a continuous cavity drift correction may be performed by:

$$\Delta\Phi_{b,corr} = \Delta\Phi_b - (n_b \lambda_a / n_a \lambda_b)\Delta\Phi_a. \quad (18)$$

Then, the $\Phi_b$ data may be smoothed by using a moving average filter, and the smoothed $\Phi_b$ data may be subtracted from the $\Phi_b$ data. The phase nonlinearities of $\Phi_b$ derived that way may then be used to correct the linear phase data stored in LUT of the second processor 272. That is, CP2 may be used to overwrite initial linear phase data stored in the LUT by corresponding phase-corrected phase data.

It is to be noted that CP2 requires a tunable second laser 120. However, in various cases, e.g. if no phase correction is applied, if phase correction is performed by using other processes as described above or if, e.g., the phase nonlinearities of $\Phi_a$ obtained during CP1 are also used to correct the $\Phi_b$ data, the second laser 120 must not be a tunable laser.

In the following two different approaches, the Synthetic Wavelength Approach (SWA) and the Combinatory Fringe Number Approach (CFNA), are outlined and may be used to obtain accurate absolute distance measurement values during device operation. Both approaches may either use phase data corrected for nonlinearities (e.g. as obtained earlier during an initialization procedure, e.g. by CP1 and/or CP2) or, if lower resolution is sufficient, linear phase data which has not been corrected for nonlinearities.

Synthetic Wavelength Approach (SWA)

The SWA is a scheme to determine an absolute distance x with high accuracy. It may include a number of processes with refined determination of absolute distance. Each of these processes are exemplary and could e.g. be substituted by other processes. Further, depending on the accuracy needed, one or more of these processes may be omitted.

SWA_P1 (Coarse Absolute Distance Determination)

In a first process (P1) of the SWA, which will be referred to as SWA_P1 in the following, a coarse absolute distance may be determined. To that end, a wavelength sweep of the first laser 110 is performed as already described herein. The (interferometric) phases $\Phi_a(t=0)$ and $\Phi_a(t=T)$ are recorded (these phases may already be corrected by their nonlinearities, i.e. they may be computed based on phase-corrected LUT phase data). Further, the phase $\Phi_b$ is recorded during the wavelength sweep of the first laser 110. Similarly, phase values of $\Phi_b$ which are already corrected by their nonlinearities may be used. Then, a coarse absolute distance $x_{fti}$ may be calculated according to equation (7). Thus, the coarse absolute distance is based on the first demodulation signal and on the second demodulation signal obtained during the sweep of the first frequency while the second frequency may be fixed.

That is, the coarse value of the absolute distance may be obtained by a method comprising sweeping the first tunable frequency of a first light modulated by the first modulating frequency over a first frequency interval; inputting the first light into the Fabry-Pérot interferometer cavity; measuring a first phase shift by demodulating an interference measurement signal based on a detected interference pattern generated by the Fabry-Pérot interferometer cavity with the first modulating frequency and a harmonic frequency thereof; generating a second frequency of a second light modulated by a second modulating frequency; inputting the second light into the Fabry-Pérot interferometer cavity; measuring a second phase shift by demodulating the interference measurement signal with the second modulating frequency and a harmonic frequency thereof; and computing the coarse value of the absolute distance based on the first frequency interval, the first phase shift and the second phase shift.

SWA_P2 (Intermediate Absolute Distance Determination)

In a subsequent process (P2) of the SWA, which is referred to as SWA_P2 in the following, an intermediate absolute distance $x_s$ may be determined. The determination of the intermediate absolute distance $x_s$ may be performed on a "synthetic" wavelength $\Lambda$ that is greater than the two real wavelengths $\lambda_a$, $\lambda_b$. When the synthetic wavelength $\Lambda$ is greater than the uncertainty of the coarse absolute distance obtained in, e.g., SWA_P1, the interference order (i.e. the fringe number) of the synthetic wavelength can be determined unambiguously. From this integer interference order and its fractional part, the more accurate intermediate absolute distance $x_s$ can be calculated. That is, in SWA_P2, the computation unit 170 is configured to compute the intermediate absolute distance $x_s$ based on the fringe number $N_s$ and a phase of the synthetic wavelength $\Lambda$.

More specifically, the synthetic phase $\Phi_s$, which is the phase of a beating pattern produced by mixing the signals of the two lasers, is calculated by:

$$\Phi_s = \Phi_a - \Phi_b \tag{19}$$

The synthetic wavelength is defined as:

$$\Lambda = \lambda_a \lambda_b/(n_a\lambda_b - n_b\lambda_a), \text{ with } \lambda_a < \lambda_b. \tag{20}$$

The fringe number $N_s$ of the synthetic wavelength may be determined using the coarse absolute distance $x_{fti}$ as, e.g., determined from SWA_P1. $N_s$ is defined as the greatest integer that fulfills the condition $N_s < 2px_{fti}/\Lambda$, expressed by:

$$N_s = \lfloor((2px_{fti}/\Lambda)-(\Phi_s \bmod(2\pi)/2\pi)+0.5)\rfloor. \tag{21}$$

Using this result together with the synthetic phase $\Phi_s \bmod(2\pi)$, the intermediate accurate absolute distance $x_s$ may be determined according to:

$$x_s = (N_s + \Phi_s/2\pi)\Lambda/2p. \tag{22}$$

To unambiguously assign the synthetic fringe number $N_s$, the total uncertainty $\delta x$ of the coarse absolute distance measurement (e.g. performed by SWA_P1) must not exceed ½p of the synthetic wavelength, expressed by the equation:

$$\delta x < \Lambda/2p. \tag{23}$$

This relation defines a lower limit for the synthetic wavelength $\Lambda$, as $\delta x$ is a given limit that comes along with the accuracy limit of the coarse absolute distance measurement, e.g. caused by the diode lasers used in the measurement device 100, 200. Thus $\delta x$ should be chosen to be as small as possible in order to be tolerant against the uncertainty $\delta\Phi_s$ of the synthetic phase. By way of example, the uncertainty of the synthetic phase $\delta\Phi_s$ measured with commercially available diode lasers may presently be of the order of $\delta\Phi_s/2\pi = 0.02$.

Figure 8A:
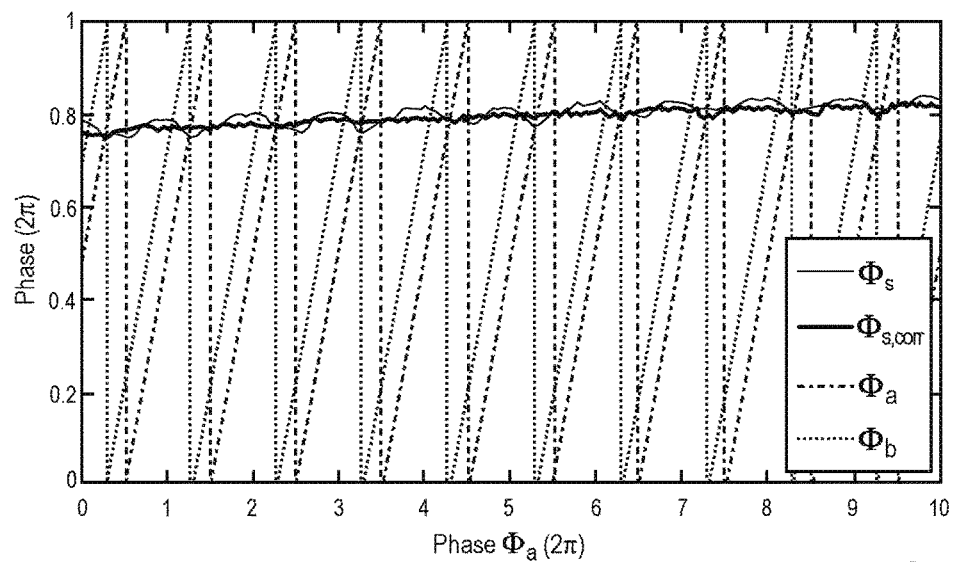
FIG. 8A is a graph schematically illustrating the measured phases $\Phi_a$, $\Phi_b$ of the first and second wavelength lights and the measured phase $\Phi_s$ of the synthetic wavelength as well as a corrected phase $\Phi_{s,corr}$ of the synthetic wavelength that has been corrected for nonlinearities of the phases of first and second wavelength lights.
Figure 8B:
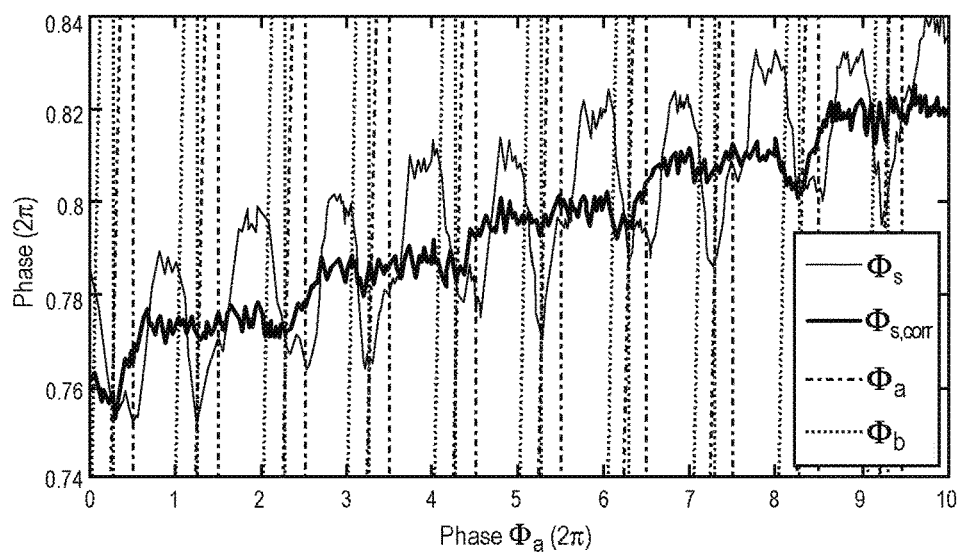
FIG. 8B is a graph illustrating an enlarged portion of the graph of FIG. 8A using a phase scale magnification.

Given that phase corrected values of $\Phi_a$ and $\Phi_b$ have been computed before in accordance with processes CP1 and CP2, corrected synthetic phase values may be obtained by applying the LUT's that correct the nonlinearities of the real phases $\Phi_a$ and $\Phi_b$. FIG. 8A and zoomed FIG. 8B illustrate the curves of the real phases $\Phi_a$, $\Phi_b$, the synthetic phase $\Phi_s$ of a drifting cavity and the curve of the corrected synthetic phase $\Phi_{s,corr}$, which is obtained by using the corrected values of $\Phi_a$ and $\Phi_b$, e.g. by applying a LUT that corrects for the nonlinearities of $\Phi_a$ and $\Phi_b$.

Due to the nonlinearities and signal noise, the uncertainty of the intermediate absolute distance $x_s$ may still come along with an uncertainty of about $\delta x < \lambda/4$. To further reduce this uncertainty to the nm range, an assignment between synthetic and real fringe number may be made in a following process referred to as SWA_P3 in order to obtain a high accuracy absolute distance.

SWA_P3 (High Accuracy Absolute Distance Determination)

In a further process (P3) of the SWA, which is referred to as SWA_P3 in the following, a high accuracy absolute distance may be determined. The high accuracy absolute distance may be obtained by determining the interference order (i.e. fringe number) of one of the lasers 110, 120. That way, an absolute distance uncertainty in the nm range can be obtained. By way of example, the fringe number $N_b$ of the second laser 120 may be determined using the intermediate absolute distance $x_s$ derived from, e.g., the synthetic wavelength evaluation of SWA_P2. The fringe number $N_b$ is defined as the greatest integer that fulfills the condition $N_b < 2px_s/\lambda_b$ expressed as:

$$N_b = \lfloor ((2px_s/\lambda_a) - (\Phi_a \bmod(2\pi)/2\pi) + 0.5) \rfloor. \quad (24)$$

The high accuracy absolute distance $x_0$ is determined from the fringe number $N_b$ according to:

$$x_0 = (N_b + \Phi_b/2\pi)\lambda_b/2p. \quad (25)$$

To ensure a fringe number assignment without ambiguity to provide for an uncertainty in e.g. the nm range, the total uncertainty of the intermediate absolute distance determination (e.g. by SWA_P2), namely $\delta\Phi_s$, should not exceed a phase uncertainty that is equal to the ratio of the real wavelength and the synthetic wavelength, $2\pi\lambda/\Lambda$, expressed by the relation:

$$\delta\Phi_s < 2\pi\lambda/\Lambda, \quad (26)$$

which corresponds to a position uncertainty $\delta x = \lambda_b/(2p)$. It is obvious that $\lambda$ should be chosen as large as possible. In the example presented herein, e.g. $\lambda_b > \lambda_a$, and consequently $\lambda = \lambda_b$ may be chosen. However, $\lambda = \lambda_a$ may also be used.

Figure 7:
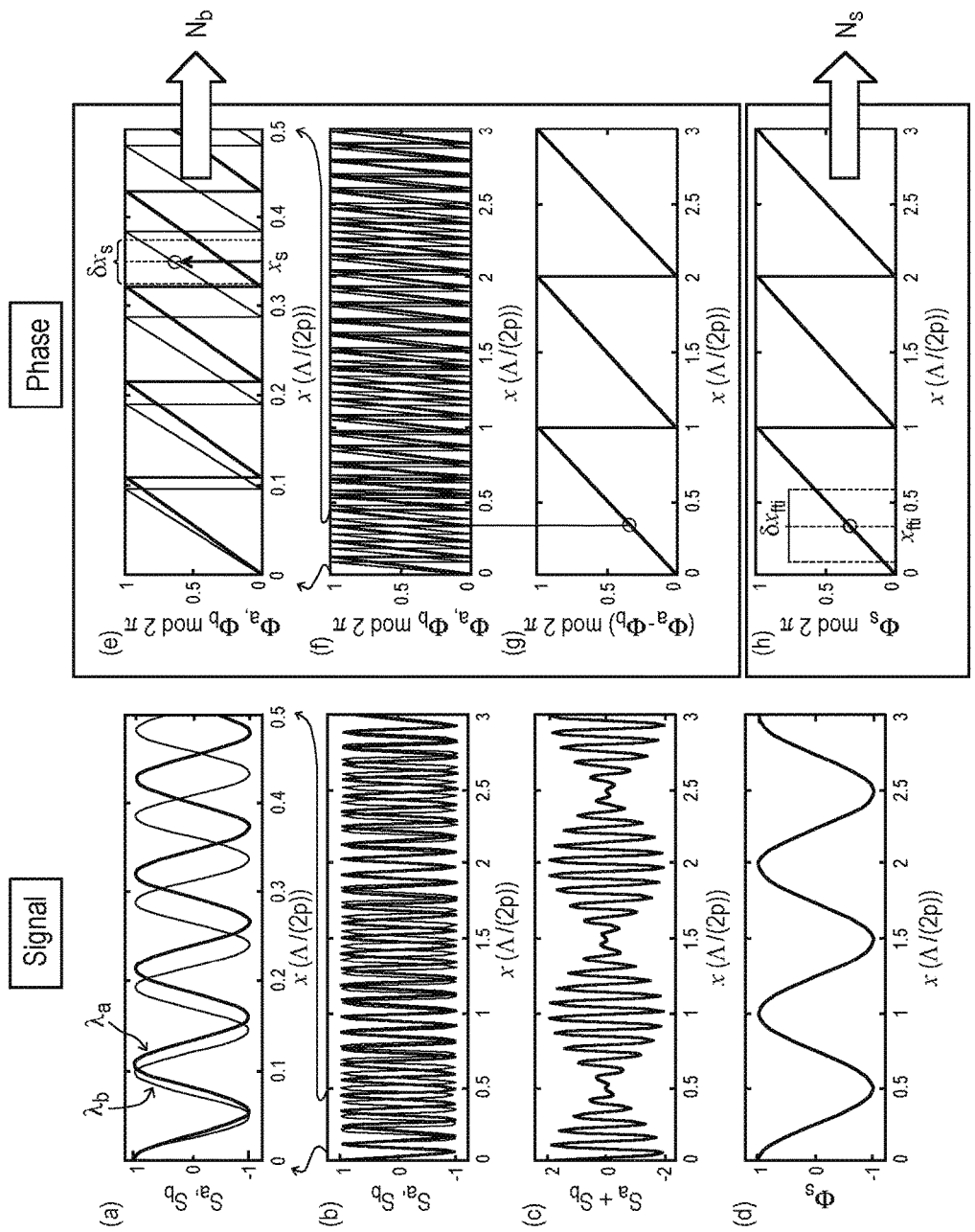
FIG. 7 illustrates signal changes (left portion) and phase changes (right portion) of an interference measurement signal when two wavelengths are coupled into an interferometer cavity, and schematically illustrates, by way of example, a synthetic wavelength approach for computing the absolute distance of an object based on a fringe number $N_s$ of the synthetic wavelength and a fringe number $N_b$ of the second wavelength light.

FIG. 7 illustrates exemplary signal curves and phase curves appearing in the SWA. FIGS. 7(a) and 7(b) illustrate the signals $S_a$, $S_b$ obtained by demodulating the first and second laser light, respectively. FIG. 7(c) illustrates the beating pattern generated by $S_a + S_b$. The synthetic phase $\Phi_s$ having the periodicity of the beating pattern is illustrated in FIG. 7(d).

FIGS. 7(e)-7(h) illustrate the processes P2 and P3 of the SWA as explained above. Referring to FIG. 7(h), the coarse absolute distance $x_{fti}$ has already been determined, e.g., by SWA_P1 or another method for coarse absolute distance determination. Then, given $\delta x_{fti}$ is small enough, the fringe number $N_s$ of the synthetic wavelength may be computed according to equation (21).

The intermediate accurate absolute distance $x_s$ may then be calculated according to equation (22) based on the synthetic fringe number $N_s$ and the (possibly phase corrected) synthetic phase $\Phi_s$ in, e.g. SWA_P2, see FIG. 7(g).

Then, using e.g. SWA_P3, the fringe number $N_b$ (or $N_a$) may be computed based on the intermediate absolute distance $x_s$ and equation (24), see FIGS. 7(f)-7(e), and the high accuracy absolute distance $x_0$ may be computed based on the fringe number $N_b$ and a phase of the second wavelength light according to equation (25) or based on the fringe number $N_a$ and a phase of the first wavelength light analogously to equation (25). Thus, the computation unit 170 is configured to calculate a high accuracy absolute distance $x_0$ based on the fringe number $N_b$ (or $N_a$) and a phase of the second wavelength $\lambda_b$ (or a phase of the first wavelength $\lambda_a$).

It is to be noted that SWA_P1, SWA_P2 and SWA_P3 are not required to be performed in combination. For SWA_P2, the coarse absolute distance $x_{fti}$, which is needed as an input variable, does not need to be determined by SWA_P1. Further, for SWA_P3, the intermediate accurate absolute distance $x_s$ needed as an input variable may also be provided by a different process than SWA_P2. In some cases, the accuracy of SWA_P1 or SWA_P2 may be sufficient, and therefore, the following processes (SWA_P2 and SWA_P3 or SWA_P3) may not be needed.

Combinatory Fringe Number Approach (CFNA)

The CFNA provides another scheme to compute a high accuracy absolute distance x. In contrast to SWA, no synthetic wavelength is used. Similar to the SWA, basically only one of the two lasers 110, 120 must be tunable (at least if the correction process CP2 to obtain phase corrected values of $\Phi_b$ is not performed or if such phase corrected values are obtained by other methods). However, it may be advantageous if both lasers are tunable, e.g. if more independent data sets are to be collected for obtaining higher accuracy or if a consistency check is desired. Thus, in various embodiments, not only the wavelength sweep laser 110 (e.g. laser A) but also the displacement tracking laser 120 (e.g. laser B) may be tunable, i.e. configured to perform a frequency sweep, and the roles of both lasers as wavelength sweep laser (i.e. tunable wavelength operation) and displacement tracking laser (i.e. constant wavelength operation) may be interchanged during the course of the measurement.

Further, as already described above, both laser wavelengths are modulated at two different frequencies so that they can be distinguished from each other in the computation unit 170. The same set-up as described above, e.g., with reference to devices 100, 200, can be used. That is, optical interferences in the Fabry-Pérot interferometer cavity 140 lead to photo measurement signals (in-phase signals and their quadrature signals) that can be determined independently for each of the two lasers. Further, the correction processes CP1 and CP2 may have been performed in advance, e.g. during an initialization procedure as already described, such that, e.g., the LUT's are configured to correct the real phases $\Phi_a$, $\Phi_b$ for their nonlinearities.

Generally, as will be explained in more detail below, the CFNA uses an extremum principle for determining a high accuracy absolute distance x. The CFNA may be based on recording fractional values of interferometric phases of both laser lights at start and/or stop points of wavelength sweeps, on establishing one or more sets of fringe number combinations based on a coarse knowledge of an absolute distance and on applying an extremum principle for electing a specific fringe number combination from each of the sets of fringe number combinations.

CFNA_P1 (Measurement for Determining Start Fractional Phases)

In a first process (P1) of the CFNA, which will be referred to as CFNA_P1 in the following, the laser wavelengths of the first and second lasers 110, 120 may be set to start values $\lambda_{a,s}$ and $\lambda_{b,s}$ respectively. This may be done by stabilizing the lasers 110, 120 to known wavelengths $\lambda_{a,s}$ and $\lambda_{b,s}$ respectively, e.g. by using feedback loops and/or gas cells as described above. In the following, the index s refers to "start" and the index e refers to "end". $\lambda_{a,s}$ and $\lambda_{b,s}$, are known to the desired accuracy. The cavity length, e.g. the absolute distance x of the second resonator mirror 142, is unknown at the start of the initial measurement described below.

In CFNA_P1, fractional values $2\pi\epsilon_{a,s}$ and $2\pi\epsilon_{b,s}$ of the interferometric phases (i.e. the real phases $\Phi_a$, $\Phi_b$ or the phase corrected values of $\Phi_a$ and $\Phi_b$) may be measured. These start fractional values $2\pi\epsilon_{a,s}$ and $2\pi\epsilon_{b,s}$ of both interferometric phases are recorded. This may be performed, e.g., independently from the quadrature signals originating from each of the lasers. The absolute phases (i.e. the start fringe numbers $N_{a,s}$ and $N_{b,s}$) are unknown but the start fractional phase values $2\pi\epsilon_{a,s}$ and $2\pi\epsilon_{b,s}$ may be measured with high interferometric precision.

CFNA_P2 (First Laser Wavelength Sweep)

In an optional subsequent process (P2) of the CFNA, which will be referred to as CFNA_P2 in the following, the wavelength $\lambda_a$ of the first laser 110 (laser A) is swept. The wavelength of the first laser 110 is shifted continuously to another precisely known wavelength value $\lambda_{a,e}$. At the same time the wavelength $\lambda_b$ of the second laser 120 (laser B) may be maintained at a constant and exact value, e.g. at its stabilized start value $\lambda_{b,s}$. Shifting the wavelength of the first laser 110 is performed slow enough that the corresponding interferometric phase shift can be measured.

During the operation of shifting the wavelength of the first laser 110, the associated phase shift may be continuously recorded until the laser wavelength has reached its stable exact end value $\lambda_{a,e}$. When the wavelength $\lambda_a$ has reached its end value $\lambda_{a,e}$, both the single value $\Delta\Phi_a$ of the phase displacement of the light of the first laser 110 during the wavelength sweep as well as the single value $\Delta\Phi_b$ of the phase displacement of the light of the second laser 120 during the wavelength sweep are recorded. Because the wavelength $\lambda_b$ has been kept constant during this operation, a non-zero phase displacement $\Delta\Phi_b$ will be solely due to a change $\delta x$ in the cavity length x. In contrast, the phase displacement $\Delta\Phi_a$ results both from the intended wavelength shift caused by the wavelength sweep and from any change $\delta x$ in the cavity length (e.g. a displacement $\delta x$ of the target).

CFNA_P3 (Computation of a Coarse Value of x and, e.g., an Accurate Value of $\delta x$)

In a further optional process (P3) of the CFNA, which will be referred to as CFNA_P3 in the following, the values x and $\delta x$ of the cavity length and the change in the cavity length that occurred during the first laser wavelength sweep may be computed by, e.g., using some of the following equations:

$$\Phi_{a,s} = \frac{4\pi p n_a}{\lambda_{a,s}} x, \tag{27}$$

$$\Phi_{a,e} = \frac{4\pi p n_a}{\lambda_{a,s} + \delta\lambda_a}(x + \delta x), \tag{28}$$

$$\Phi_{b,s} = \frac{4\pi p n_b}{\lambda_b} x, \tag{29}$$

$$\Phi_{b,e} = \frac{4\pi p n_b}{\lambda_b}(x + \delta x), \tag{30}$$

$$\Delta\Phi_a = \Phi_{a,e} - \Phi_{a,s}, \text{ and} \tag{31}$$

$$\Delta\Phi_b = \Phi_{b,e} - \Phi_{b,s}. \tag{32}$$

This is a system of 6 unknown quantities $\Phi_{a,s}$, $\Phi_{a,e}$, $\Phi_{b,s}$, $\Phi_{b,e}$, x, and $\delta x$. From equation (32) the displacement $\delta x$ in the cavity length that occurred during the wavelength shift may be calculated according to:

$$\delta x = \frac{\lambda_b}{4\pi p n_b}\Delta\Phi_b, \tag{33}$$

which is typically accurate within nanometers.

The cavity length x (absolute distance x) at the initial measurement CFNA_P1 is:

$$x = \frac{\Lambda_a}{4\pi p n_a}\left(\Delta\Phi_a - \frac{\lambda_b}{\lambda_{a,e}}\Delta\Phi_b\right), \tag{34}$$

where the effective wavelength $\Lambda_a$ is given by:

$$\Lambda_a = \frac{\lambda_{a,s}\lambda_{a,e}}{\lambda_{a,s} - \lambda_{a,e}}. \tag{35}$$

From a mathematical point of view, equation (34) already solves the problem. However, in reality the measured values of $\Delta\Phi_a$ and $\Delta\Phi_b$ may not be sufficiently exact and may deviate from the reality due to phase noise and other measurement errors inherent to interferometric displacement sensing. Note that an error $\phi$ on the phase measurement leads to an error $\Sigma$ on the position expressed by:

$$\Sigma = \frac{\Lambda_a}{4\pi p n_a}\phi. \tag{36}$$

The effective wavelength $\Lambda_a$ is significantly longer than $\lambda_{a,s}$ since the wavelength shift $\lambda_{a,e} - \lambda_{a,s}$ is typically only a small fraction of $\lambda_{a,s}$. In fact the same phase error $\phi$ leads to an actual position error of:

$$\sigma = \frac{\lambda_a}{4\pi p n_a}\phi. \tag{37}$$

In other words, the error on the evaluated position x is $\Sigma = \sigma(\Lambda_a/\lambda_{a,s}) = \sigma\lambda_{a,s}/(\lambda_{a,e} - \lambda_{a,s})$. This indicates an amplification of the error with a leverage factor of $\Lambda_a/\lambda_{a,s}$, which may be about $10^3$. That is, an actual position error of 10 nm would lead to an error of 10 μm of the evaluated absolute distance x. Thus, the error of the evaluated absolute distance x may be far larger than the measurement pitch of $\lambda_a/2p$. Therefore, in reality, equation (34) may only provide for a coarse estimation of the absolute distance x.

It is to be noted that a determination of a coarse value of x may also be performed by processes different from CFNA_P3.

CFNA_P4 (Computation of an Accurate Value of x)

In a further process (P4) of the CFNA, which will be referred to as CFNA_P4 in the following, some others of the equations (27)-(32) are exploited to reduce an error on the evaluation of x. As it is possible to measure the fractional parts of the phases $\epsilon_{a,s}$, $\epsilon_{a,e}$, $\epsilon_{b,s}$, $\epsilon_{b,e}$ within the measurement pitch, the following equations may be used:

$$\Phi_{a,s} = 2\pi(N_{a,s} + \epsilon_{a,s}), \tag{38}$$

$$\Phi_{a,e} = 2\pi(N_{a,e} + \epsilon_{a,e}), \tag{39}$$

$$\Phi_{b,s} = 2\pi(N_{b,s} + \epsilon_{b,s}), \text{ and} \tag{40}$$

$$\Phi_{b,e} = 2\pi(N_{b,e} + \epsilon_{b,e}). \tag{41}$$

Unknown are the integer fringe numbers $N_{a,s}$, $N_{a,e}$, $N_{b,s}$, $N_{b,e}$, which are also referred to as the interference orders in the art. Combining these equations with equations (27)-(30), the following equations are obtained:

$$N_{a,s} + \epsilon_{a,s} = \frac{2pn_a}{\lambda_{a,s}}x, \tag{42}$$

$$N_{b,s} + \epsilon_{b,s} = \frac{2pn_b}{\lambda_b}x, \tag{43}$$

$$N_{a,e} + \epsilon_{a,e} = \frac{2pn_a}{\lambda_{a,s} + \delta\lambda_a}(x + \delta x), \text{ and} \tag{44}$$

$$N_{b,e} + \epsilon_{b,e} = \frac{2pn_b}{\lambda_b}(x + \delta x). \tag{45}$$

A coarse absolute distance value of x is then input into the equations (42) and (43) to get coarse values of the fringe numbers $N_{a,s}$, $N_{b,s}$. By way of example, the coarse value of x may be computed by CFNA_P3 or SWA_P2, however, also other procedures may be used to obtain the coarse absolute distance value x.

Then, possible combinations $[N_{a,s}|N_{b,s}]$ of fringe numbers are established. As the typical uncertainty on the fringe numbers $N_{a,s}$ and $N_{b,s}$ at the start are known (e.g. plus or minus a known integer M), the set of all possible combinations of $[N_{a,s}|N_{b,s}]$ may be given by the fringe number combinations lying around the coarse values of $N_{a,s}$, $N_{b,s}$ within the tolerance of M, respectively.

Then, the term $$(N_{a,s} + \epsilon_{a,s})\frac{\lambda_{a,s}}{2p} - (N_{b,s} + \epsilon_{b,s})\frac{\lambda_{b,s}}{2p}$$

is calculated which is the condition of eliminating x between equations (42) and (43). The combination $[N'_{a,s}|N'_{b,s}]$ for which:

$$(N_{a,s} + \epsilon_{a,s})\frac{\lambda_{a,s}}{2p} - (N_{b,s} + \epsilon_{b,s})\frac{\lambda_{b,s}}{2p} \to 0 \qquad (46)$$

is 0 or closest to 0 of all possible combinations $[N_{a,s}|N_{b,s}]$ may be determined. Then, based on this minimum combination $[N'_{a,s}|N'_{b,s}]$, an accurate value of the absolute distance x may be calculated from, e.g., equation (42) or equation (43).

In other words, the equation (46) is minimized over all possible combinations of $[N_{a,s}|N_{b,s}]$ in order to determine the minimum combination $[N'_{a,s}|N'_{b,s}]$. The minimum combination $[N'_{a,s}|N'_{b,s}]$ provides the unknown value of x with high accuracy.

CFNA_P5 (Computation of an Accurate Value of x)

In another process (P5) of the CFNA, which will be referred to as CFNA_P5 in the following, some others of the equations (42)-(45), namely e.g. equations (44)-(45) may be exploited to compute an accurate value of the absolute distance of x. CFNA_P5 may be performed instead of CFNA_P4 or in addition to CFNA_P4.

After having determined the start fractional values $2\pi\epsilon_{a,s}$ and $2\pi\epsilon_{b,s}$ of both interferometric phases in accordance with CFNA_P1, in CFNA_P5, a frequency sweep of the first laser 110 and a frequency sweep of the second laser 120 are performed to deliver two sets of data, which may then be exploited to compute an accurate value of x.

The frequency sweep of the first laser 110 may be performed in accordance and, e.g., simultaneously with CFNA_P2, and reference is made to the corresponding description in order to avoid reiteration. At the end of the frequency sweep of the first laser 110, the end fractional value $2\pi\epsilon_{a,e}$ of the interferometric phase is recorded.

The frequency sweep of the second laser 120 may be performed after the end of the frequency sweep of the first laser 110. The wavelength of the second laser 120 is shifted continuously to another precisely known wavelength value $\lambda_{b,e}$. At the same time the wavelength $\lambda_a$ of the first laser 110 (laser A) may be maintained at a constant and exact value, e.g. at its stabilized end value $\lambda_{a,e}$. Shifting the wavelength of the second laser 120 is performed slow enough that the corresponding interferometric phase shift can be measured.

At the end of the frequency sweep of the second laser 120, the end fractional value $2\pi\epsilon_{b,e}$ of the interferometric phase is recorded.

Thus, the absolute phases (i.e. the end fringe numbers $N_{a,e}$ and $N_{b,e}$) are unknown but the end fractional values $2\pi\epsilon_{a,e}$ and $2\pi\epsilon_{b,e}$ of the interferometric phases may be measured with high interferometric precision.

A coarse absolute distance value of x is then input into the equations (44) and (45) to get coarse values of the fringe numbers $N_{a,e}$, $N_{b,e}$. By way of example, the coarse absolute distance value of x may have been computed in accordance with CFNA_P3 or SWA_P2, however, also other procedures may be used to obtain the coarse absolute distance value x.

Then, possible combinations of $[N_{a,e}|N_{b,e}]$ are established. As the typical uncertainty on the fringe numbers $N_{a,e}$ and $N_{b,e}$ at the end of the sweep operations are known (e.g. plus or minus a known integer M), all possible combinations of $[N_{a,e}|N_{b,e}]$ may be given by the fringe number combinations lying around the coarse values of $N_{a,e}$, $N_{b,e}$ within the tolerance of M, respectively.

Then, the term $$(N_{a,e} + \epsilon_{a,e})\frac{\lambda_{a,e}}{2p} - (N_{b,e} + \epsilon_{b,e})\frac{\lambda_{b,e}}{2p}$$

may be calculated. The combination $[N'_{a,e}|N'_{b,e}]$ for which:

$$(N_{a,e} + \epsilon_{a,e})\frac{\lambda_{a,e}}{2p} - (N_{b,e} + \epsilon_{b,e})\frac{\lambda_{b,e}}{2p} \to 0 \qquad (47)$$

is 0 or closest to 0 of all possible combinations $[N_{a,e}|N_{b,e}]$ is determined. Then, based on this minimum combination $[N'_{a,e}|N'_{b,e}]$, an accurate value of the absolute distance x may be calculated from, e.g., equation (44) or equation (45).

In other words, the equation (47) is minimized over all possible combinations of $[N_{a,e}|N_{b,e}]$ in order to determine the minimum combination $[N'_{a,e}|N'_{b,e}]$. The minimum combination $[N'_{a,e}|N'_{b,e}]$ provides the unknown value of x with high accuracy based e.g. on equation (44) or (45).

In conclusion, in the CFNA, the device 100, 200 may be configured to measure a fractional phase of the interferometric first wavelength light at a known first wavelength $\lambda_a$ and a fractional phase of the interferometric second wavelength light at a known second wavelength $\lambda_b$. The computation unit 170 may be configured to compute a plurality of possible combinations of $[N_a|N_b]$ based on the knowledge of a coarse absolute distance value. Further, the computation unit is configured to determine a specific combination $[N'_a|N'_b]$ from the plurality of possible combinations of $[N_a|N_b]$ based on an extremum principle and the measured fractional phases of the interferometric first and second wavelength lights.

CFNA_P6 (Combining the Results Obtained in CFNA_P4 and CFNA_P5)

In case both processes CFNA_P4 and CFNA_P5 have been performed, in another process (P6) of the CFNA, which will be referred to as CFNA_P6 in the following, the minimum combinations obtained in CFNA_P4 and CFNA_P5 or the absolute distance values x obtained in CFNA_P4 and CFNA_P5 may be combined. By way of example, the accurate absolute distance value x(CFNA_P4) and the accurate absolute distance value x(CFNA_P5) may be combined, e.g., by averaging to derive a further absolute distance value x. Averaging could involve evaluating the distances of the minimum combinations from the 0 condition and weighting the average based on these distances. Alternatively or in addition, a consistency check may be performed on the basis of the sets of possible combinations or on the absolute distance values x obtained in CFNA_P4 and CFNA_P5. By way of example, if the accurate absolute distance value x(CFNA_P4) and the accurate absolute distance value x(CFNA_P5) differ more than a predetermined threshold, e.g. $\lambda/4$ or $\lambda/8$, a measurement error will be assumed.

Thus, in conclusion, in the CFNA, the device 100, 200 may be configured to measure two fractional phases of the interferometric first wavelength light at a known frequency sweep start first wavelength $\lambda_{a,s}$ and a known frequency sweep end first wavelength $\lambda_{a,e}$, and to measure two fractional phases of the interferometric second wavelength light at a known frequency sweep start second wavelength $\lambda_{b,s}$ and a known frequency sweep end second wavelength $\lambda_{b,e}$. The computation unit may be configured to compute two sets of possible combinations of $[N_{a,s}|N_{b,s}]$ and $[N_{a,e}|N_{b,e}]$, respectively, based on the knowledge of a coarse absolute distance value at the frequency sweep start, wherein $N_{a,s}$, $N_{b,s}$ are the fringe numbers at the frequency sweep start first wavelength $\lambda_{a,s}$ and the frequency sweep start second wavelength $\lambda_{b,s}$, respectively, and wherein $N_{a,e}$, $N_{b,e}$ are the fringe numbers at the frequency sweep end first wavelength $\lambda_{a,e}$ and the frequency sweep end second wavelength $\lambda_{b,e}$, respectively. Further, the computation unit 170 may be configured to determine a specific combination $[N'_{a,s}|N'_{b,s}]$ and a specific combination $[N'_{a,e}|N'_{b,e}]$ of the respective sets of combinations based on an extremum principle, on the two fractional phases of the interferometric first wavelength light and on the two fractional phases of the interferometric second wavelength light.

Thus, according to one aspect the device for position or absolute distance measurement by interferometry may be configured to comprise means to sweep a first tunable frequency of a first light modulated by a first modulating frequency over a first frequency interval; to input the first light into an interferometer cavity; to comprise means to measure a first phase shift by demodulating an interference measurement signal based on an interferometric first wavelength light generated by the interferometer cavity with the first modulating frequency and a harmonic frequency thereof; and to input a second light of a second frequency modulated by a second modulating frequency into the interferometer cavity, thereby measuring a second phase shift by demodulating an interference measurement signal based on an interferometric second wavelength light with the second modulating frequency and a harmonic frequency thereof; and to comprise means to compute the coarse value of the absolute distance based on the first frequency interval, the first phase shift and the second phase shift.

The device for position or absolute distance measurement by interferometry may further comprise means configured to compute a fringe number $N_s$ of a synthetic wavelength $\Lambda = \lambda_a \lambda_b / (n_a \lambda_b - n_b \lambda_a)$ based on the coarse value of the absolute distance, where $n_a$ is the refractive index inside the interferometer cavity at the first wavelength $\lambda_a$ and $n_b$ is the refractive index inside the interferometer cavity at the second wavelength $\lambda_b$.

The device for position or absolute distance measurement by interferometry may further be configured to comprise means to measure a fractional phase of the interferometric first wavelength light at a known first wavelength $\lambda_a$ and a fractional phase of the interferometric second wavelength light at a known second wavelength $\lambda_b$; to comprise means to compute a plurality of possible combinations of $N_a$, $N_b$ based on the coarse value of the absolute distance, wherein $N_a$ is the fringe number at the known first wavelength $\lambda_a$ and $N_b$ is the fringe number at the known second wavelength $\lambda_b$; and to comprise means to determining a specific combination of $N_a$, $N_b$ from the plurality of possible combinations of $N_a$, $N_b$ based on an extremum principle and the measured fractional phases of the interferometric first and second wavelength lights.

The device for position or absolute distance measurement by interferometry may further be configured to comprise means to sweep the second frequency of the second light over a second frequency interval; to comprise means to measure two fractional phases of the interferometric first wavelength light at a known frequency sweep start first wavelength $\lambda_{a,s}$ and a known frequency sweep end first wavelength $\lambda_{a,e}$, and to measure two fractional phases of the interferometric second wavelength light at a known frequency sweep start second wavelength $\lambda_{b,s}$ and a known frequency sweep end second wavelength $\lambda_{b,e}$; to comprise means to compute a set of first combinations of $N_{a,s}$, $N_{b,s}$ and a set of second combinations of $N_{a,e}$, $N_{b,e}$ based on the coarse value of the absolute distance, wherein $N_{a,s}$, $N_{b,s}$ are the fringe numbers at the frequency sweep start first wavelength $\lambda_{a,s}$ and the frequency sweep start second wavelength $\lambda_{b,s}$, respectively, and wherein $N_{a,e}$, $N_{b,e}$ are the fringe numbers at the frequency sweep end first wavelength $\lambda_{a,e}$ and the frequency sweep end second wavelength $\lambda_{b,e}$, respectively; and to comprise means to determine a specific combination of $N_{a,s}$, $N_{b,s}$ from the set of first combinations and a specific combination of $N_{a,e}$, $N_{b,e}$ from the set of second combinations based on an extremum principle, on the two fractional phases of the interferometric first wavelength light and on the two fractional phases of the interferometric second wavelength light.

Figure 10:
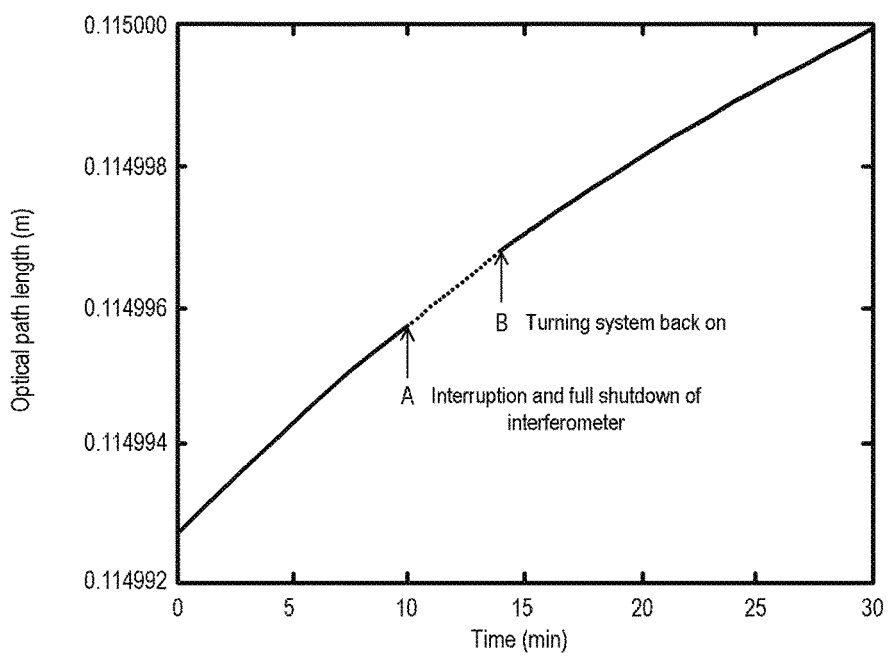
FIG. 10 is a graph illustrating the optical path length obtained by an absolute distance measurement over time, including a full shutdown and a restart of the interferometer device.

FIG. 10 illustrates an interruption and full shutdown of an interferometer device at point A and, e.g. a few minutes or hours later, a system restart at point B. Typically, during the pause of measurement, the object is subjected to a displacement caused, e.g., by external influences such as vibrations, etc. In accordance with the disclosure, the device 100, 200 for absolute distance measurement is able to acquire an accurate absolute distance of the object at point B, i.e. when the system is turned back on and the measurement is resumed. This greatly improves the practical versatility of an interferometric position measurement device. Starting from point B, when the device has resumed the measurement and determined the new absolute distance, the subsequent determination of x may be performed by applying a conventional incremental displacement measurement approach. Such incremental displacement measurement, which is, e.g. described in EP 2 363 685 A1, may merely require one laser (e.g. laser 110).

What is claimed is:

1. A device for absolute distance measurement, comprising:
    a first tunable light source configured to emit a first wavelength light of a first tunable frequency modulated by a first modulating frequency;
    a second light source configured to emit a second wavelength light of a second frequency modulated by a second modulating frequency;
    an optical coupler configured to couple the first wavelength light and the second wavelength light into an interferometer cavity;

an interferometer detector coupled to the interferometer cavity and configured to provide an interference measurement signal based on interferometric first and second wavelength light;

a demodulator unit configured to generate a first demodulation signal based on the interference measurement signal by demodulation with the first modulating frequency and a second demodulation signal based on the interference measurement signal by demodulation with the second modulating frequency; and a computation unit configured to compute an absolute distance by evaluating the first demodulation signal acquired during a sweep of the first tunable frequency and the second demodulation signal, wherein:

the computation unit is configured to compute a coarse absolute distance based on the first demodulation signal acquired during the sweep of the first tunable frequency and the second demodulation signal, the computation unit is configured to compute a fringe number $N_s$ of a synthetic wavelength $\Lambda = \lambda_a \lambda_b / (n_a \lambda_b - n_b \lambda_a)$ based on the coarse absolute distance, $n_a$ is a refractive index inside the interferometer cavity at the first wavelength $\lambda_a$, and $n_b$ is a refractive index inside the interferometer cavity at the second wavelength $\lambda_b$.

2. The device of claim 1, comprising:
a frequency sweep control unit configured to sweep the first tunable frequency over a first frequency interval.

3. The device of claim 2, wherein the frequency sweep control unit is configured to apply a temperature variation to the first tunable light source in order to control the sweep of the first tunable frequency.

4. The device of claim 2, wherein the frequency sweep control unit is configured to apply an operating current variation to the first tunable light source in order to stabilize the first tunable frequency.

5. The device of claim 1, wherein the second light source is a tunable light source such that the second frequency is a second tunable frequency.

6. The device of claim 1, comprising:
a first gas cell interacting with the first wavelength light; and
a first detector coupled to the first gas cell and configured to provide a first absorption measurement signal based on an absorption line of the first gas cell.

7. The device of claim 1, comprising:
a second gas cell interacting with the second wavelength light; and
a second detector coupled to the second gas cell and configured to provide a second absorption measurement signal based on an absorption line of the second gas cell.

8. The device of claim 1, wherein the demodulator unit comprises:
a first demodulator associated with the first modulating frequency and configured to demodulate the interference measurement signal with the first modulating frequency; and
a second demodulator associated with the first modulating frequency and configured to demodulate the interference measurement signal with a harmonic of the first modulating frequency.

9. The device of claim 1, wherein the demodulator unit comprises:

a third demodulator associated with the second modulating frequency and configured to demodulate the interference measurement signal with the second modulating frequency; and
a fourth demodulator associated with the second modulating frequency and configured to demodulate the interference measurement signal with a harmonic of the second modulating frequency.

10. The device of claim 1, wherein the computation unit is configured to compute an intermediate absolute distance based on the fringe number $N_s$ and a measured phase of the synthetic wavelength $\Lambda$.

11. The device of claim 10, wherein the computation unit is configured to compute a fringe number $N_b$ of the second wavelength $\lambda_b$ based on the intermediate absolute distance.

12. The device of claim 11, wherein the computation unit is configured to calculate a high accuracy absolute distance based on the fringe number $N_b$ and a measured phase of the second wavelength $\lambda_b$.

13. A device for absolute distance measurement, comprising:
a first tunable light source configured to emit a first wavelength light of a first tunable frequency modulated by a first modulating frequency;

a second light source configured to emit a second wavelength light of a second frequency modulated by a second modulating frequency;

an optical coupler configured to couple the first wavelength light and the second wavelength light into an interferometer cavity;

an interferometer detector coupled to the interferometer cavity and configured to provide an interference measurement signal based on interferometric first and second wavelength light;

a demodulator unit configured to generate a first demodulation signal based on the interference measurement signal by demodulation with the first modulating frequency and a second demodulation signal based on the interference measurement signal by demodulation with the second modulating frequency; and a computation unit configured to compute an absolute distance by evaluating the first demodulation signal acquired during a sweep of the first tunable frequency and the second demodulation signal, wherein:

the device is configured to measure a fractional phase of the interferometric first wavelength light at a known first wavelength $\lambda_a$ and a fractional phase of the interferometric second wavelength light at a known second wavelength $\lambda_b$, the computation unit is configured to compute a plurality of possible combinations of $N_a$, $N_b$ based on knowledge of a coarse absolute distance, $N_a$ and $N_b$ are fringe numbers at the known first wavelength $\lambda_a$ and at the known second wavelength $\lambda_b$, respectively, and the computation unit is configured to determine a specific combination of $N_a$, $N_b$ from the plurality of possible combinations of $N_a$, $N_b$ based on an extremum principle and measured fractional phases of the interferometric first and second wavelength lights.

14. A device for absolute distance measurement, comprising:
a first tunable light source configured to emit a first wavelength light of a first tunable frequency modulated by a first modulating frequency;

a second light source configured to emit a second wavelength light of a second frequency modulated by a second modulating frequency;

an optical coupler configured to couple the first wavelength light and the second wavelength light into an interferometer cavity;

an interferometer detector coupled to the interferometer cavity and configured to provide an interference measurement signal based on interferometric first and second wavelength light;

a demodulator unit configured to generate a first demodulation signal based on the interference measurement signal by demodulation with the first modulating frequency and a second demodulation signal based on the interference measurement signal by demodulation with the second modulating frequency; and a computation unit configured to compute an absolute distance by evaluating the first demodulation signal acquired during a sweep of the first tunable frequency and the second demodulation signal, wherein:

the device is configured to measure two fractional phases of the interferometric first wavelength light at a known frequency sweep start first wavelength $\lambda_{a,s}$ and a known frequency sweep end first wavelength $\lambda_{a,e}$, and to measure two fractional phases of the interferometric second wavelength light at a known frequency sweep start second wavelength $\lambda_{b,s}$ and a known frequency sweep end second wavelength $\lambda_{b,e}$, the computation unit is configured to compute two sets of possible combinations of $N_{a,s}$, $N_{b,s}$ and $N_{a,e}$, $N_{b,e}$, respectively, based on knowledge of a coarse absolute distance at a frequency sweep start, $N_{a,s}$, $N_{b,s}$ are fringe numbers at the known frequency sweep start first wavelength $\lambda_{a,s}$ and the known frequency sweep start second wavelength $\lambda_{b,s}$, respectively, $N_{a,e}$, $N_{b,e}$ are fringe numbers at the known frequency sweep end first wavelength $\lambda_{a,e}$ and the known frequency sweep end second wavelength $\lambda_{b,e}$, respectively, and the computation unit is configured to determine a specific combination of $N_{a,s}$, $N_{b,s}$ and a specific combination of $N_{a,e}$, $N_{b,e}$ based on an extremum principle, on the two fractional phases of the interferometric first wavelength light and on the two fractional phases of the interferometric second wavelength light.

\* \* \* \* \*